United States Patent [19]

Cooney

[11] Patent Number: 5,054,972
[45] Date of Patent: Oct. 8, 1991

[54] ROTARY TOOL FOR SHARPENING STUDS IN SNOWMOBILE TREADS

[76] Inventor: Kevin G. Cooney, R.D. 1, Box 1329, East Stroudsburg, Pa. 18301

[21] Appl. No.: 523,767

[22] Filed: May 15, 1990

[51] Int. Cl.[5] .......................... B23B 51/00; B23C 5/02
[52] U.S. Cl. ...................................... 408/211; 407/48; 408/233; 408/227; 408/713
[58] Field of Search ...................... 408/203.5, 211, 233, 408/713, 227, 231, 232; 407/48, 57, 103, 104

[56] References Cited

U.S. PATENT DOCUMENTS

| 1,721,378 | 7/1929 | Draeger | 408/203.5 X |
| 4,505,626 | 3/1985 | Benhase | 408/227 X |
| 4,637,762 | 1/1987 | Acker | 408/203.5 |

FOREIGN PATENT DOCUMENTS 2437126  3/1975  Fed. Rep. of Germany ...... 408/227

*Primary Examiner*—Steven C. Bishop
*Attorney, Agent, or Firm*—Caesar, Rivise, Bernstein, Cohen & Pokotilow, Ltd.

[57] ABSTRACT

A rotatable arbor-type tool for use in a portable power drill is provide for sharpening the ends of metal studs and particularly snowmobile tread studs or spikes. The tool has a cylindrical head with a tapered central opening axially aligned with the axis of rotation of the head. Radial grooves extend from the central opening through the wall of the head to the outer surface thereof. One wall of each groove constitutes an abutment wall against which a preferably triangular cutting blade having a thickness substantially less than the groove width is positioned. The cutting blade is forceably held against the abutment wall by a set screw extending against the cutting blade from the opposite wall leaving an opening extending along the groove past the cutting tool sufficiently wide to provide an exit from the central opening for chips cut from the end of the stud by the cutting edges of the cutting tool. The abutment wall is that wall which faces the direction of rotation of said head. A method of sharpening studs in situ in a snowmobile tread is also provided.

12 Claims, 2 Drawing Sheets

ROTARY TOOL FOR SHARPENING STUDS IN SNOWMOBILE TREADS

FIELD OF THE INVENTION

This invention relates to sharpening metal members such as spikes and the like, and in particular relates to sharpening those members by a rotary tool in the nature of a hollow arbor upon which cutting members are mounted.

BACKGROUND OF THE INVENTION

It is often necessary to form a conical, tapered or similar shape on the end of an elongated member. In the past this has been done using rotating, arbor-type arrangements in which a cutting blade or blades are carried by a hollow, rotatable tool head within which the cutting blades are arranged so as to act upon an elongated member inserted thereinto. The rotating arbor design of a conventional pencil sharpener is an example of this broad type of apparatus. In such an apparatus, the elongated object is inserted into the rotatable arbor, usually during rotation of the arbor or just before the beginning of rotation, whereupon angled blades mounted upon the exterior of the arbor contact the end of the pencil and shave wood from the surface to form a point. The blades are usually held in place by threaded tension studs. In this type of apparatus, a scroll or strip of wood shavings is expelled from the side of the arbor as angled blades mounted upon the arbor contact the surface of the end of the pencil. While such an arrangement is relatively effective for shaving wood chips from a wooden member, whether in the form of a pencil or wooden dowel, such an arrangement is not particularly suitable for operating upon extremely hard objects, such as metal spikes and the like.

One form of metal spike or stud that frequently requires replacement or sharpening are the studs used in conjunction with snowmobile treads. Such studs are secured into the structure of the snowmobile tread for engagement with the snowy and, particularly, icy surfaces over which the snowmobile passes. Without the studs, the tread tends to slip upon such surfaces, thus considerably impeding the forward movement of the snowmobile. Even though these studs, which are customarily screwed into the tread structure, are considerably harder and tougher than snow and ice, because the studs are continuously exposed to abrasion from the constantly changing frozen surfaces over which the snowmobile travels, the studs are rather quickly worn back and lose their sharpness. Also, snowmobile studs are frequently exposed not only to consolidated and unconsolidated snow surfaces and icy surfaces, but also are exposed to ground or earth surfaces including rock surfaces where the snow and ice cover is relatively sparse or thin, or even entirely lacking.

In view of the abrasion and scouring to which the studs are exposed, snowmobile tread studs very rapidly become dull and must either be sharpened or replaced. Under poor snow conditions where the studs may frequently contact ground surfaces, the studs may wear out and require renewal every few days. Renewal is customarily accomplished by unscrewing the studs from the treads and replacing them with new or refurbished or reclaimed studs. Since it is difficult to collect and resharpen the removed studs, the replaced studs are customarily discarded when the new studs are screwed into the tread. However, in some instances the removed studs, and reinstalled in the tread as reclaimed studs.

Replacement of the entire stud is time-consuming and uneconomical, but no good alternative is available. There is therefore, a need for an easy method and means for sharpening snowmobile studs while the studs are still mounted in the snowmobile tread. Moreover, there is need for a tool to sharpen studs and elongated members in general.

Various prior tools for forming sharpened ends on elongated cylindrical and other members are available as described, hereafter, but none of these tools has provided a suitable arrangement for sharpening or resharpening snowmobile tread studs and the like while the studs remain.

Examples of prior art means for sharpening the ends of various types of elongated members are disclosed in the following U.S. patents, U.S. Pat. No. 828,632, issued Aug. 14, 1906 to I. W. Sprink, discloses a hollow milling cutter for thread cutting or general milling. The cutter is provided with a hollow central section surrounded by a generally solid outer section. Four radial grooves are provided in the sides of the head. These grooves accommodate flat tool bits which may slide radially in the slots. Each tool bit is provided with a projecting stud at the rear thereof which fits into an inclined camming slot in a circular plate having a knurled outer surface enabling the plate to be turned. When the knurled circular plate is turned, the studs at the rear of the tool bit are propelled inwardly or outwardly by the camming slots. There are no specific chip orifices except for the open end of the bit.

U.S. Pat. No. 1,368,459 issued Feb. 15, 1921 to J. E. Sheuman, discloses a cutter head having a series of sliding cutting tools which may be adjusted inwardly or outwardly by means of a screw adjustment. The inner ends of the cutting tools may be used to cut or form the outer surface of a cylindrical surface, and the outer ends of the cutting tools may be used to cut the inner side of a hollow cylindrical surface. A central shank is provided for mounting in the chuck of a power tool.

U.S. Pat. No. 1,688,558, issued Oct. 23, 1928 to O. Severson, discloses a hollow milling tool in which the cutting blades or bits are mounted in segmented sections that may be moved inwardly and outwardly. The blades are fitted into slots in the segmented sections. The cutting blades are essentially wedged into the slots, and there are no chip orifices provided adjacent the blades for the removal of chips.

U.S. Pat. No. 1,721,378, issued July 16, 1929 to G. J. Draeger, discloses a so-called floating tool holder wherein cutting blades or bits are pivotally mounted in the arms of a floating tool holder mounted, in the bottom and sides of a cylindrical bit by means of a set screw.

U.S. Pat. No. 3,335,526, issued Aug. 15, 1967 to C. P. Weiss, discloses a pipe scarfing tool in which a more or less conical, internally abrasive cone is mounted on the end of a hand drill. The scarfing tool is provided with a central rotatable mandrill to hold the pipe against the inclined inner abrasive surface. A series of shaving or chip orifices is provided at the bottom of the central opening of the tool to allow escape of chips and dust. No tool bits or cutters are shown since the scarfing of the pipe is accomplished by the abrasive internal surface.

U.S. Pat. No. 4,234,276, issued Nov. 18, 1980 to G. D. Meier, Jr., discloses an off-set dresser for dressing the ends of conical electrodes. A tool bit having a conical opening is mounted in a slot in a central tool bit having an outer retainer, nut or cover. The nut is threaded onto the chuck to hold the dressing blade in place. The end of the electrode which is to be dressed is inserted into a hole or orifice in the top of the nut so that it is dressed by the rotating tool.

U.S. Pat. No. 4,295,763, issued Oct. 20, 1981 to J. Cunniff, discloses a plug cutter for the shaping of wooden plugs. The plug cutter makes use of a series of upwardly extending blades mounted on the sides of a rotating chuck or holder. The blades may be angled at different upwardly extending angles by the use of shims so that a series of conical or cylindrical faces may be formed on the plug.

U.S. Pat. No. 4,449,328, issued May 22, 1984 to R. H. Gillett et al., discloses a honing tool for an exterior cylindrical surface. A honing stone is mounted on a pivoting arm which may be cambered inwardly by a sliding arrangement on an outer sheath. A series of honing stones may be used, each provided with a wedge for moving it radially inwardly.

U.S. Pat. No. 4,798,503, issued Jan. 17, 1989 to B. M. Huju, discloses a tenon forming tool for the formation of tenons, particularly on the ends of fence rails. The tool is designed for use on the end of a hand drill and has a plurality of cutter blades mounted on a conical tool surface for shaving the ends of timber. Each cutting blade is mounted adjacent a chip orifice in the conical surface, and there are additional chip orifices at the bottom of the tool where the cylindrical portion of the tenon extends. The cutting blades are mounted by set screws on the interior surface of the conical portion of the tool adjacent the chip orifices. Consequently, the arrangement depends entirely on the strength of the set screws which secure the cutting blade to the conical surface of the tool. The fastening screws which fasten the blades to the surface are, placed in shear, which provides undesirable arrangement.

As pointed out above, there has been a need for a practical means for sharpening the ends of spikes, studs and other elongated metal members by a relatively simple and easy to use arrangement.

OBJECTS OF THE INVENTION

It is an object of the present invention to provide a device that may be used directly upon snowmobile spikes or studs to resharpen worn or dulled studs, without removing the studs from their normal mounting.

It is a another object of the invention to provide a relatively simple and inexpensive device that can be used to quickly and conveniently sharpen elongated members, such as snowmobile studs, in situ.

It is a further object of the invention to provide a rotatable arbor-type device that can be mounted in a portable hand-held power tool to sharpen elongated members, particularly snowmobile studs, in situ.

It is a still further object of the invention to provide a method and means for sharpening snowmobile studs while the studs are still mounted in a snowmobile tread by using a simple and convenient device that can be used by a relatively unskilled person for on-the-spot sharpening.

It is a still further object of the present invention to provide a simple and convenient method for sharpen elongated members embedded at one end in a second body by using rotatable device.

It is a still further object of the invention to provide a rotatable arbor head which has a plurality of chip discharging slots therein.

BRIEF SUMMARY OF THE INVENTION

The present invention provides a method for sharpening the studs in snowmobile treads without removing the studs from the treads. The invention further provides a rotatable device for accomplishing the sharpening of snowmobile studs and other elongated work pieces which require tapered ends. The device of the invention includes a rotatable arbor mounted upon a shank or spindle adapted for mounting in the chuck of a portable drill or other rotary-type power tool. The head of the arbor has a central, conically tapered opening coaxial with the axis of rotation of the arbor. The tapered opening preferably has inside dimensions approximately the same size as or somewhat larger than the desired outside dimensions of the conical or other taper to be applied or maintained upon the end of the work piece. At least four slots in the arbor extend completely through the arbor wall and provide slots for mounting cutting blades. The arbor is designed to rotate clockwise when in use. The leading wall of each slot relative to the clockwise rotation is provided with a threaded opening therethrough which accommodates a set screw-type mounting member. The following wall (opposite the leading wall) of each slot provides a cutting member abutment surface against which the cutting member is seated during cutting operations. Each slot has a width greater than the thickness of the cutting member. When each cutting member is properly seated within each slot against the following wall abutment surface, there is a clearance between the leading edge of the cutting member and the leading wall of the slot. This clearance is sufficient to accommodate chips cut from the surface of the work piece by the cutting blades.

A mounting member or set screw extends through the threaded opening in the leading wall of each slot. The set screw is rotated all the way toward the following wall and the cutting member within the slot, contacts the side of the cutting member and secures the cutting member in place against the abutment or following wall.

When the device is mounted in a rotary power tool and rotated in the proper direction, the cutting member is held securely against the abutment wall and has a cutting surface at the edge thereof which extends from the slot into the central conically tapered opening. The cutting surface removes small chips or cuttings from the surface of the work piece. The force of the cutting operation against the cutting member is transferred to the abutment or following wall of each slot.

The cutting member is preferably a triangularly shaped blade having three cutting edges, and the side angles of each blade are variable.

The method of the invention involves mounting the rotatable cutting device of the invention in a portable drill or the like, maneuvering a snowmobile onto its side to expose the protruding ends of the tread studs and applying the rotating cutting device head sequentially against the ends of the studs in order to sharpen the ends of the studs by shaving chips from the edges thereof.

It is necessary to have at least four cutting members in the device head in order to effectively cut and sharpen the studs without binding and damaging the cutting members or the stud. Only a few seconds contact between cutting members and the work piece is usually necessary to effect the proper sharpening of the work piece.

DESCRIPTION OF THE PREFERRED EMBODIMENT

The present invention is directed to a method and apparatus for providing a taper on an elongated member and particularly for maintaining a desirable taper on the studs or spikes located in snowmobile treads. Such studs are usually threaded and are either screwed directly into the tread structure or are screwed into internally threaded fittings in the nature of nuts with accompanying washers disposed on the top and bottom of the tread. Some snowmobile treads are provided in addition with cleats in the form of angle sections attached to the surface of the tread to receive the studs.

Figure 1:
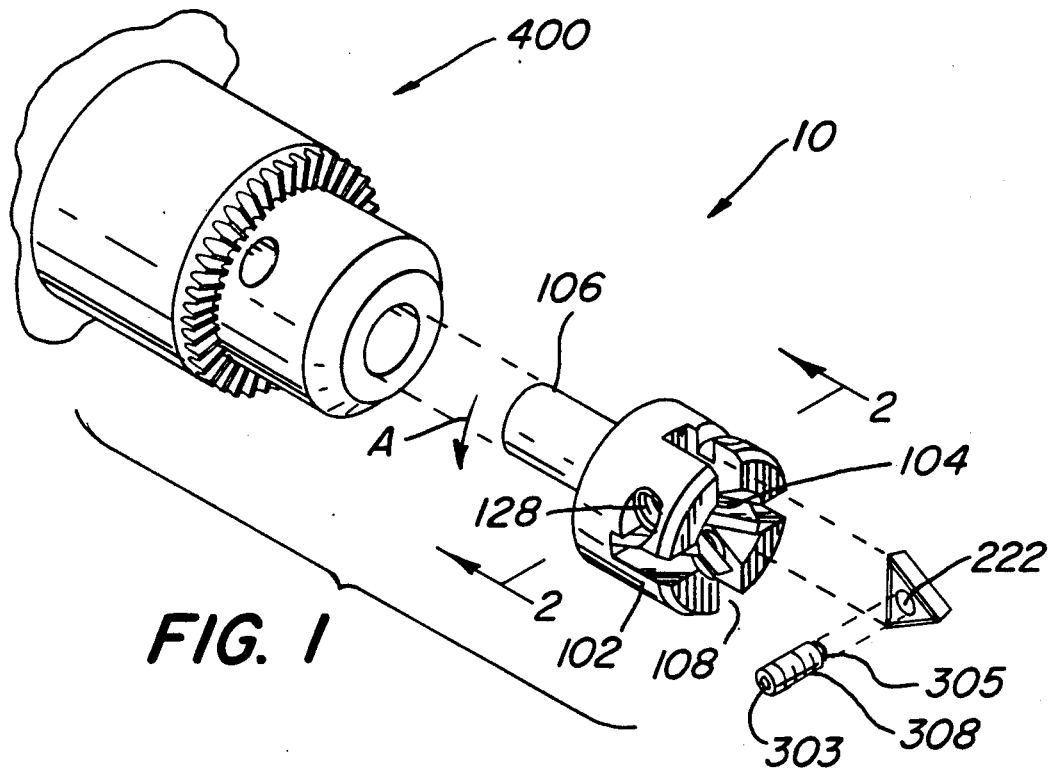
FIG. 1 is an isometric, exploded view of the rotatable cutting device of the invention.

Referring in greater detail to the various figures of the drawings wherein like reference characters refer to like parts, the rotatable cutting tool 10 of the present invention is generally shown in FIG. 1. The rotatable cutting tool 10 is comprised of a cylindrical head 102 having at one end a central tapered opening 104 and at the other end a shank 106 for mounting the cutting tool 10 in a power tool, such as a rotatable drill 400. The head 102, central opening 104 and shank 106 are coaxially aligned.

Figure 4:
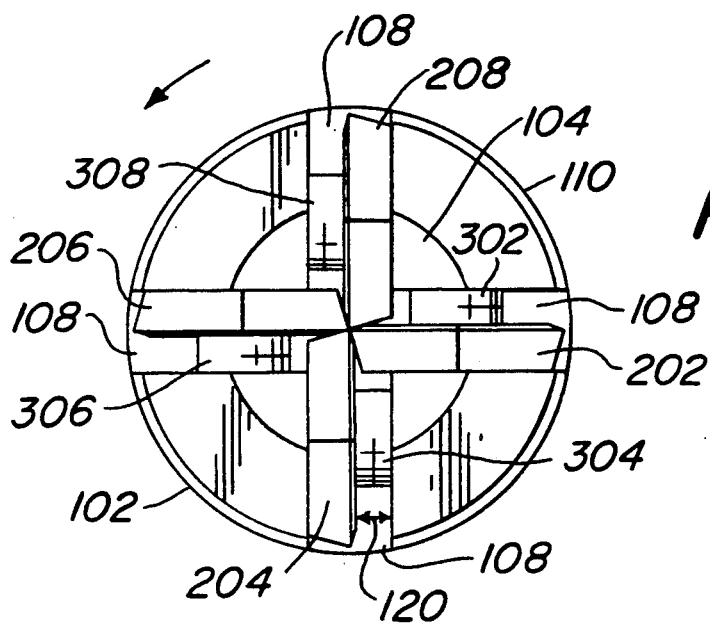
FIG. 4 is an end view of the cutting device of the invention.

As shown in FIG. 4, grooves 108 extend through the outer circumference 110 of the head 102 to the central opening 104. The grooves 108 provide mounting locations for a plurality of cutting members in the form of triangular blades 202, 204, 206 and 208 which are positioned against one of the walls of each of the grooves and extend along one edge into the central tapered opening 104.

Figure 2:
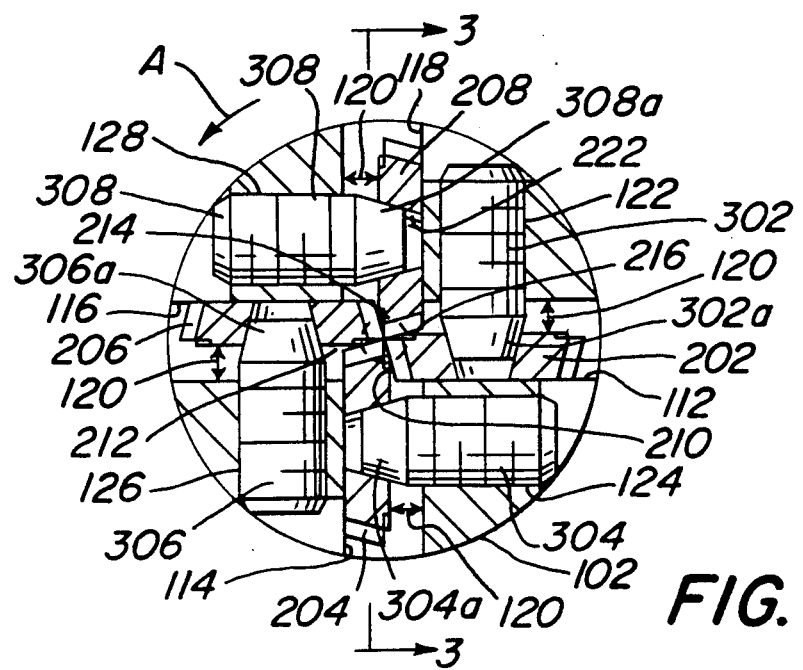
FIG. 2 is a section view of the cutting device of the invention taken along the line 202 of FIG. 1.

In the preferred embodiment, the wall of each groove 108 against which each blade 202, 204, 206 and 208 is positioned is an abutment wall whose exposed surface faces the direction of rotation of the cylindrical head 102. As shown in FIG. 2, when the head 102 is rotated clockwise (arrow A) by the power tool 400, the blades 202, 204, 206 and 208 are positioned against the abutment walls, 112, 114, 116, and 118, respectively. These abutment walls 112, 114, 116, and 118 are those walls which face in the direction of rotation of the head 102.

Each cutting blade, 202, 204, 206 and 208, therefore, is supported during rotation of the head 102 against its respective abutment wall 112, 114, 116, and 118 with only its narrow cutting edge 210, 212, 214 and 216 extending beyond the abutment walls into the central opening 104.

When the cutting tool 10 of the invention is used for sharpening the studs of a snowmobile tread, the tool 10 is designed to rotate in a clockwise manner, the power tool 400 upon which the tool 10 is mounted being adapted to rotate the tool 10 in a clockwise direction. It is customary to have right-handed threads on the studs, and during sharpening, the sharpening tool 10 should rotate in a direction that will tend to tighten, rather than unscrew, the stud within the tread.

The abutment walls 112, 114, 116 and 118 of the grooves are spaced a sufficient distance from their respective opposing walls within each groove, so that when the blades 202, 204, 206, and 208 are positioned within the grooves, a distance or opening 120 is provided between each blade and the opposing wall. This chip opening 120 is necessary to permit the chips and cuttings removed from the surface of a stud during sharpening, which may otherwise be thrust into the central opening 104, to exit from the head 102. The distance of the opening 120 must be sufficient to allow passage of substantially all material removed from the stud, although some chips may also enter the center of the opening 104 and ultimately exit through the open end thereof.

Opposite and perpendicular to each abutment wall 112, 114, 116 and 118 is a threaded bore 122, 124, 126, and 128, respectively, extending through the head toward the abutment wall. A set screw 302, 304, 306 and 308 is screwed into each threaded bore 122, 124, 126 and 128, respectively. Each set screw 302, 304, 306 and 308 is screwed into its respective bore and into the adjoining groove 108 until the screw contacts the respective cutting blade 202, 204, 206, or 208 within the groove 108. Each set screw preferably has a tapered end 302a, 304a, 306a, and 308a which contacts an opening 222 in each blade, as will be explained later. As each set screw is tightened, it securely enters the corresponding hole 222 and holds the blade 202, 204, 206 or 208 within the groove against the respective abutment wall 112, 114, 116, and 118.

Figure 3:
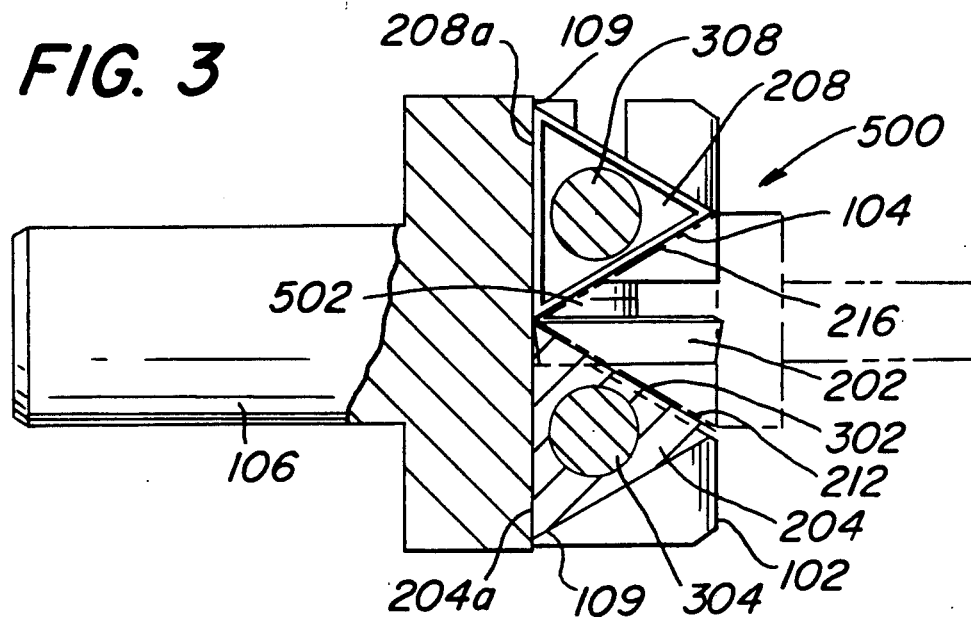
FIG. 3 is a section view of the invention taken along the line 3—3 of FIG. 2.

As shown in FIG. 3, when the bottom of each triangular cutting blade 202, 204, 206 and 208 (see 208a and 204a) is mounted flush against the bottom of the respective groove 108 and the set screws 302, 304, 306 and 308 are securely pressed against the outer side of the cutting blades 202, 204, 206 and 208, each cutting blade is very securely held in place within its groove 108 with the cutting edge 210, 212, 214 and 216 of the blade extending a very short distance into the central opening 104. In this position, the cutting edge contacts the surface of any tapered object, such as a stud 500 (dashed lines in FIG. 3), pressed into the central opening 104. Such an arrangement is particularly secure and convenient.

It has been found to be important for sharpening snowmobile studs in place on the treads of a snowmobile for the rotatable cutting tool 10 to have four grooves 108 in its surface, with a cutting blade 202, 204, 206 and 208 mounted in each groove as explained above. The cylindrical head 102 of the rotatable cutting tool 10 is placed over the end of each stud 500, preferably while not rotating, and then the electric drill 400 is operated at low speed for a short period while pressure is applied through the cylindrical head 102 to the end of the stud 502. The four triangular cutting blades 202, 204, 206 and 208 rotating about the stud 500 shave the surface of the stud, resharpening it so that it will readily penetrate the surface of deposits of snow and ice and preventing the treads of the snowmobile from slipping during usage.

It is desirable for the cutting tool to be operated in the low r.p.m. range since the operation is in fact a cutting operation and not a grinding or abrading operation and such cutting operation operates best at low speed. Each stud can be sharpened in 5 to 10 seconds, or less, even at very low cutting speed.

At stated above, it has been found that at least four cutting blades are necessary to prevent shattering of the blades upon the ends of the studs with concomitant destruction of both the blades and damaging of the tapered stud surface. This requirement may be related to the fact that the studs are mounted in a rubber tread member and are therefore subject to more than normal vibration. Since the cutting tool is mounted on the end of a rotary drill and is applied by hand to each individual stud, it is subjected to considerable stress and vibrational wear, and it is important that the cutting tool be very strong and that the blades be mounted securely in the head. The arrangement of the invention provides such secure mounting and strength of the head. It is noted, for example, that the major portion of the force of the rotation of the cutting head upon each cutting blade is taken directly by a abutment wall within the groove 108, while the blade is maintained stationary against the wall by its respective set screw. Unlike some blades secured within rotating heads by threaded means where the force against the blade accompanying the cutting action is largely taken in tension against the threaded members, in the present arrangement not only is the major force against the blade taken by the abutment wall, but any force tending to separate the blade from the wall is taken not in tension, but in compression against the set screw.

It has been found that while it is necessary to have at least four grooves and four blades 202, 204, 206 and 208 in the cutting head 102 in order to allow efficient cutting or shaving of the heads of the studs without damage to the cutting blades or the stud surface, it is, in general, desirable not to have more than four grooves or cutting blades in the head unless special high-strength materials are used to form the head 102 or the head is treated to provide more than the usual strength. The head 102 can also be made more massive by increasing its outside diameter relative to the diameter of the conical or center opening 104 to provide more mass for support of the set screws 302, 304, 306 and 308 therein. In such instances, it may be possible to increase the number of grooves and cutting blades in the head beyond the preferred four cutting blades. However, it will be understood that the diameter of the head cannot be increased without limit because of the additional weight which would be entailed and the clearance required to fit the rotatable head over studs which are closely spaced with respect to each other on the tread. A further consideration is that the larger the diameter of the rotating tool, the more expensive such tool becomes and the more power is necessary to rotate it. However, it may be advantageous, in some instances, to increase the diameter of the rotating head or the strength of the materials of which the head is constructed in order to accommodate additional grooves and cutting blades and thereby possibly increase the smoothness of operation during sharpening of the tread spikes.

As shown in FIG. 1 the set screws 302, 304, 306 and 308 are preferably hexhead-type set screws which may be turned by the end of a hexagonal exterior wrench as known to those skilled in the art. That is, the head of each set screw is provided with a hexagonal opening 303 in the end for receipt of a conventional hexagonal O.D. wrench. The head 303, 305, 307 and 309 of each set screw is accommodated in an orifice 122, 124, 126 and 128 in the circumference of the cylindrical head 102. The orifices or depressions in the head 102 allow the set screw 302, 304, 306 and 308 to be readily seated below the level of the circumference of the cutting head so that the set screws will not snag or catch upon external objects during use.

The shank 106 of the rotatable cutting tool 10 is a conventional round shank which may have a conventional ⅜th inch or ¼ inch size outside diameter or O.D. for reception into the chuck of a portable drill. Since it is desirable for the sharpening tool to be accommodated in a conventional home drill, the shank should not be too large, since most home drills are no larger than ½ or ⅜th inch and, in fact, many are only ¼ inch capacity. This is an additional reason why it may be undesirable for the head of the tool to be too massive, since instability might be caused if a massive head were accommodated upon a relatively small shank.

The preferred cutting blades 202, 204, 206 and 208 are triangular in shape. At least one edge of each blade is sharpened to a cutting edge which extends into the tapered central opening 104 and accomplishes the actual cutting (FIGS. 2 and 4). A center alignment and attachment hole 222 goes all the way through each cutter blade and provides a means for aligning the blade in proper position within the tool head 102, since the hole 222 aligns with the opposing set screw 302, 304, 306 or 308. The hole 222 preferably extends all the way through the blade. The opposing set screw fits only part way into the hole, at the tapered end portion 302a, 304a, 306a or 308a of the set screw.

Figure 5:
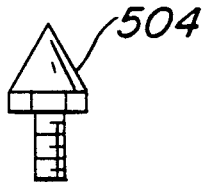
FIGS. 5-7 are side views of snowmobile studs showing different angles on the studs.
Figure 6:
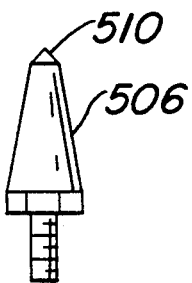
Figure 7:
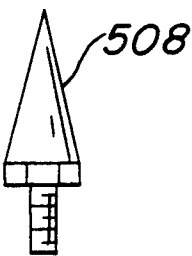

As shown in FIGS. 5-7, snowmobile studs come in different configurations 504, 506 and 508. It is within the scope of this invention to provide a device which is capable of sharpening all types of snowmobile studs. The arrangement of the cutting blades 202, 204, 206 and 208 as shown in FIGS. 2, 3 and 4 provides for all of the cutting edges of the blades which extend into the conical opening 104 to form a point at location X (FIG. 4) in order to provide a pointed tip on the snowmobile stud.

It should also be understood that, depending on the angle of inclination of the cutting edge of the blade members, the angle of the conical shape of the stud member will vary. For example, as shown in FIG. 3, the entire outer surface of the stud 500 fits within the angle of inclination of the cutting blades to form a stud 504 similar to that depicted in FIG. 5. A steeper angle of inclination and longer cutting blades will result in a stud 508 having the configuration of that in FIG. 7.

While it is preferred to fit the stud into the conical opening 104 as snugly as possible so that the entire outer surface of the stud 500 is sharpened by the cutting edge of the cutting blade, it is possible with the device of the invention to sharpen only the tip of the stud when the conical opening is positioned over the end of the stud. As shown in the stud 506 of FIG. 6, only the tip 510 of the stud is sharpened by the cutting edges of the cutting blades, and not the entire outer surface of the stud.

As can be seen from the above, the present invention provides a very practical and effective rotating cutting tool for sharpening various elongated objects including, in particular, tread spikes on a snowmobile-type vehicle.

While the invention has been described in considerable detail, in connection with the above drawings and explanations of the various embodiments illustrated, the invention is not to be limited to the particulars of any such embodiments, but is to be construed broadly with reference to the language of the appended claims so as to provide the broadest possible interpretation of such claims in view of the prior art and thereby to effectively encompass the intended scope of the invention.

What is claimed is:

1. A rotatable cutting device for forming a tapered external surface on an elongated work piece, said device comprising:

a cylindrical cutting head having a circumference, a first end and a second end, a longitudinal axis therethrough, and a conically tapered orifice extending thereinto from said first end toward said second end coaxial with the longitudinal axis of said cutting head for receiving said work piece, said cutting head also having a plurality of radial slots therein extending from said circumference into said tapered orifice, said slots having a pair of opposing wall surfaces spaced from each other;

cutting means in at least one of said slots extending into said tapered orifice for cutting said work piece, said cutting means having a thickness less than the distance between said opposing walls of said slot; and engagement means urging against said cutting means for holding said cutting means against one wall of said slot in a spaced relationship from the opposing wall of said slot.

2. A device as claimed in claim 1, further comprising shank means connected to said second end of said cutting head and axially aligned with the longitudinal axis of said cutting head for connecting said cutting head to a rotary power source.

3. A device as claimed in claim 1, wherein said cutting means is comprised of a cutting blade.

4. A device as claimed in claim 3, wherein said cutting blade has a cutting edge which extends into said tapered orifice.

5. A device as claimed in claim 4, wherein said cutting edge of said cutting blade extends into said tapered orifice substantially parallel to the taper of said orifice.

6. A device as claimed in claim 3, wherein said cutting blade is triangular and has cutting edges on three sides thereof.

7. A device as claimed in claim 1, wherein said cutting head has a plurality of bores therein, each of said bores extending from the circumference of said cutting head transversely into one of said slots.

8. A device as claimed in claim 7, wherein:

each bore is threaded; and said engagement means is comprised of at least one screw means threaded through said bore transverse to said slot containing said cutting means, said screw means being rotatable toward and engageable with said cutting means within said slot.

9. A device as claimed in claim 1, wherein:

one of said walls of each slot faces in the direction of rotation of said rotatable cutting head; and said cutting means is held against said wall of said slot facing the direction of rotation of said cutting head by said engagement means.

10. A device as claimed in claim 1, wherein:

said cutting head has four slots therein, said slots being substantially perpendicular to each other, and said cutting means comprises a cutting blade positioned in each of said slots and extending into said tapered orifice.

11. A device as claimed in claim 10, wherein said cutting means comprises a blade member having a tapered cutting edge extending into said tapered orifice, said tapered cutting edge corresponding to the taper to be formed on said work piece.

12. A device as claimed in claim 11, wherein said cutting edge of said blade member has a 60 degree taper.

* * * * *